United States Patent [19]

Ashley

[11] 4,020,293

[45] Apr. 26, 1977

[54] DRIVE CIRCUITRY WITH ERROR DETECTION AND COMPENSATING THRESHOLD ARRANGEMENT

[75] Inventor: Albert H. Ashley, Holliston, Mass.

[73] Assignee: GTE Sylvania Incorporated, Stamford, Conn.

[22] Filed: Feb. 25, 1976

[21] Appl. No.: 661,260

[52] U.S. Cl. ................ 179/18 GF; 340/146.1 AB; 340/166 R
[51] Int. Cl.² .................. H04M 3/00; G06F 11/08
[58] Field of Search ................. 179/18 GF, 15 BF; 340/146.1 AB, 166 R, 365 E; 307/43, 241

[56] References Cited

UNITED STATES PATENTS

| 3,720,938 | 3/1973 | Leposavic | 340/365 E |
| 3,940,571 | 2/1976 | Ashley | 179/18 GF |

*Primary Examiner*—Thomas A. Robinson
*Attorney, Agent, or Firm*—David M. Keay; Elmer J. Nealon; Norman J. O'Malley

[57] ABSTRACT

Apparatus for producing drive signals on any of several lines in response to input signals. Each of the lines has a drive circuit connected thereto. Resistances connected to the outputs of the drive circuits are connected together at a common juncture which acts as a summing point having a voltage proportional to the number of lines having drive signals thereon. First and second comparators are coupled to the common juncture and to threshold setting arrangements. The first comparator produces a signal if one or more of the lines has a drive signal and the second comparator produces a signal if two or more of the lines have signals. The outputs of the comparators are combined in a logic arrangement to produce an error signal if none of the lines has a signal or if two or more of the lines have signals. The threshold setting arrangements include a threshold setting drive circuit identical to the other drive circuits. The output of the threshold setting drive circuits is coupled to the comparators to provide reference voltages thereto. Conditions which cause variations in the signals from the drive circuits and consequently the voltage at the common juncture cause proportional variations in the output of the threshold setting drive circuit. Thus, a compensating arrangement is provided for adjusting the reference voltages to the comparators.

10 Claims, 2 Drawing Figures

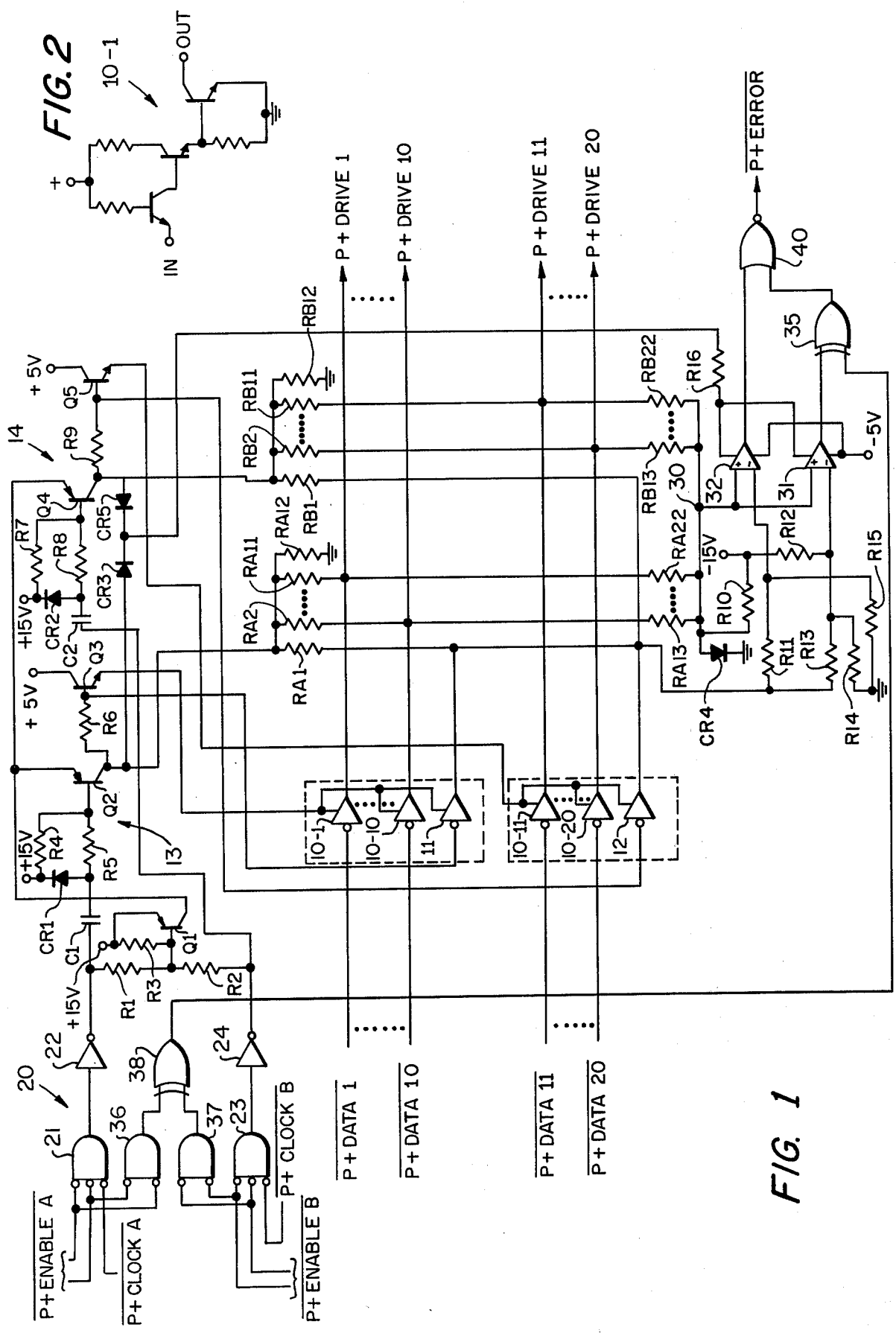

DRIVE CIRCUITRY WITH ERROR DETECTION AND COMPENSATING THRESHOLD ARRANGEMENT

The invention herein described was made in the course of a contract with the Department of the Army.

BACKGROUND OF THE INVENTION

This invention relates to circuitry for supplying drive power to any of a number of paths. More particularly, it is concerned with drive circuitry including arrangements for determining if the proper number of paths are being driven.

Crosspoint switching arrays employing solid state devices have been developed for use in switching networks of communication systems. An array of switching circuits employing solid state devices is described and claimed in U.S. Pat. No. 3,826,873 entitled "Switching Circuits Employing Latching Type Semiconductor Devices and Associated Control Transistors" which issued on July 30, 1974 to A. Frederick Susi and is assigned to the assignee of the present invention. As described in the patent to Susi each switching circuit of an array is connected to one control line in each of two sets of control lines. An individual switching circuit is activated to permit the transmission of signals by the simultaneous application of momentary pulses of opposite polarity on its two control lines. The two sets of control lines, one for positive-going control pulses and the oter for negative-going control pulses, are connected to the switching circuits of the array so that only one switching circuit is selected when a positive-going pulse is applied to one of the control lines of one set and a negative-going pulse is applied to one of the control lines of the other set.

In switching arrays of the foregoing type it is desirable before activating a switching circuit during a switching operation to ascertain that one and only one switching circuit is being selected. That is, it is desirable to be able to determine that a control pulse will be present on one and only one positive-going control line and also that a control pulse will be present on one and only one negative-going control line. Thus it is assured that one and only one switching circuit of the array will be activated during the switching operation to permit the transmission of signals therethrough.

Suitable drive circuitry for use with switching circuits which includes an error detection arrangement for providing an error signal if a control pulse is present on more or less than one of the control lines of each set is described in detail in application Ser. No. 520,413 filed Nov. 4, 1974, now U.S. Pat. No, 3,940,571 issued Feb. 24, 1976, entitled "Drive Circuitry with Error Detection" by Albert H. Ashley and assigned to the assignee of the present application. The circuitry described in the application employs a drive circuit in each control line for producing a control pulse. A resistance network including a resistance connected to the output of each drive circuit produces a voltage at a summing point which is proportional to the number of control lines of a set having control pulses present. The summing point is connected to logic circuitry comparators. The logic circuitry produces an error signal if none of the control lines of the set has a control pulse present or if more than one of the control lines of the set have control pulses present.

The drive circuitry described in the above-mentioned application has been found to operate satisfactorily for systems having of the order of eight control lines in a set as disclosed in the application. Although the number of control lines of a set may be increased, under certain conditions if the number of lines of a set is greatly increased, for example to twenty lines, minor variations in the characteristics of components may introduce errors. More specifically, variations in the output voltages of the drive circuits affect the voltage present at the summing point. Since the increment of voltage produced at the summing point by each drive circuit producing a pulse is relatively small for a relatively large number of control lines, the possibility of error increases with increased number of control lines.

SUMMARY OF THE INVENTION

Apparatus in accordance with the present invention permits the monitoring of a relatively large number of paths, such as control lines, to determine whether or not signals are present on only a predetermined number of the paths, for example, a single one of the control lines. The apparatus employs a plurality of single paths. Each path includes an input terminal, which is adapted to receive input signal data, and an output terminal. A driving means in each path has an input connection coupled to the input terminal and an output connection coupled to the output terminal. The apparatus also includes additional driving means having an input connection and an output connection.

An activating means is coupled to the driving means of the plurality and also to the additional driving means to apply operating potentials. Each of the driving means produces a first output voltage at its output connection in response to a first input condition at its input connection and produces a second output voltage at its output connection in response to a second input condition at its input connection when the operating potentials are applied to the driving means by the activating means. A resistance network is provided having an equal plurality of resistances. Each resistance has one end connected to the output connection of a different one of the driving means of the plurality and the other end connected to a common juncture. The voltage level produced at the common juncture is proportional to thenumber of output connections which have the first output voltage present.

A first comparator means has a first and a second input with the first input connected to the common juncture of the resistance network. A first threshold setting means is connected to the output connection of the additional driving means and to the second input of the first comparator means. The first threshold setting means operates to produce a voltage at the second input to the first comparator means which is less than the voltage produced at the first input to the first comparator means when a predetermined number ($N$, for example 1) of output connections of a driving means of the plurality have a first output voltage present thereon and greater than the voltage produced at the first input to the first comparator means when the predetermined number minus one ($N$-1, for example 0) of output connections of the driving means of the plurality have a first output voltage present thereon. The first comparator means operates to produce a first output signal when the voltage at its first input is less than that at its second input and produces a second output signal when the voltage at its first input is more than that at its second input.

A second comparator means has a first and second input with the first input connected to the common juncture of the resistance network. A second threshold setting means is connected to the output connection of the additional driving means and to the second input of the second comparator means. The second threshold setting means operates to produce a voltage at the second input to the second comparator means which is less that the voltage produced at the first input of the second comparator means when the predetermined number plus one ($N+1$, for example 2) output connections of the driving means of the plurality have the first output voltage present thereon and greater than the voltage produced at the first input to the second comparator means when the predetermined number ($N$, for example 1) of output connections of the driving means of the plurality have the first output voltage present thereon. The second comparator means produces a first output signal when the voltage at its first input is less than that at its second input and produces a second output signal when the voltage at its first input is more than that at its second input.

An output means is coupled to the first comparator means and to the second comparator means. The output means produces an error signal in response to a first output signal from the first comparator means or in the response to a second output signal from the second comparator means. That is, if the predetermined number ($N$) of paths is one, the output means produces an error signal if there is no signal present on any of the paths or if there are signals present on two or more signal paths. If only one path is transmitting a signal, no error signal is produced.

BRIEF DESCRIPTION OF THE DRAWINGS

Additional objects, features, and advantages of apparatus in accordance with the present invention will be apparent from the following detailed discussion together with the accompanying drawings wherein:

FIG. 1 is a schematic circuit diagram of drive circuitry and detection circuitry in accordance with the present invention for providing positive-going control pulses to a set of control lines; and FIG. 2 is a circuit diagram of a component employed in the circuit of FIG. 1.

DETAILED DESCRIPTION OF THE INVENTION

A complete description of drive circuitry apparatus having error detection and its use in a switching array is described in detail in the above-mentioned application of Albert H. Ashley. The system as described therein is for utilization with a matrix having eight control lines for positive-going control signals and eight control lines for negative-going signals. As explained therein error detection circuitry produces an error signal if during the interrogation of a set of control lines either none of the control lines has a signal present or two or more of the control lines have signals present.

FIG. 1 illustrates circuitry in accordance with the present invention for producing positive-going drive pulses on a set of twenty control lines and for detecting whether or not a drive pulse is being produced on one and only one of the control lines of the set. The circuit of FIG. 1 receives switching information in the form of negative-going signals $\overline{P+DATA\ 1}$ - $\overline{P+DATA\ 20}$ at the respective data input terminals. In response to the input signals the circuit produces positive-going P+DRIVE 1 - P+DRIVE 20 signals at corresponding output terminals.

The apparatus includes twenty drive circuits 10-1 - 10-20, one in each of the lines. The apparatus also includes two additional drive circuits 11 and 12 which function as threshold setting circuits as will be explained hereinbelow. All the drive circuits are identical open-collector inverting buffers. One of the drive circuits, for example 10-1, is illustrated in detail in FIG. 2. The output terminals of the drive circuits 10-1 - 10-10 and 11 are each connected through a resistance RA1 - RA11, respectively, to a first section 13 of a power supply. Similarly the output terminals of drive circuits 10-11 - 10-20 and 12 are connected through a resistance RB1 - RB11, respectively, to a second section 14 of the power supply.

The first section 13 of the power supply includes a +15 volt source connected through a resistance R4 to the base of a PNP transistor Q2. The collector of transistor Q2 is connected to resistances RA1 - RA11 and through resistance RA12 to ground. The collector of transistor Q2 is also connected through resistance R6 to the base of an NPN transistor Q3. The base of transistor Q3 is connected to the input terminal of threshold setting drive circuit 11. The collector of transistor Q3 is connected to a +5 volt source and its emitter is connected to the power supply terminals of drive circuits 10-1 - 10-10 and 11 to provide energizing potential thereto. The second section 14 of the power supply includes a similar arrangement of +15 volt and +5 volt sources, transistors Q4 and Q5, resistances R7 and R9, connections to the resistances RB1 - RB11 and through RB12 to ground, a connection to the input terminal of threshold setting drive circuit 12, and connections to drive circuits 10-11 - 10-20 and 12 to supply operating potentials thereto.

The two sections of the power supply are activated by a control arrangement 20. The control arrangement 10 includes a NOR gate 21 having three inputs, two for enabling signals $\overline{P+ENABLE\ A}$ and one for a clock signal $\overline{P+CLOCK\ A}$. The output of NOR gate 21 is applied to an inverter 22. The control arrangement also includes a a NOR gate 23 having two inputs for enabling signals $\overline{P+CLOCK\ B}$ and an input for a clock signal $\overline{P+CLOCK\ B}$. The output of NOR gate 23 is applied to an inverter 24. The outputs of the inverters 22 and 24 are connected to resistances R1 and R2, respectively. The juncture of resistances R1 and R2 is connected to the base of a PNP transistor Q1 and through a resistance R3 to a +15 volt source. The emitter of transistor Q1 is connected directly to the +15 volt source. The collector of transistor Q1 is connected to the emitters of transistors Q2 and Q4 in the first and second sections 13 and 14, respectively, of the power supply. The output of inverter 22 is also connected by way of capacitance C1, diode CR1, diode CR1, and resistance R5 to the base of transistor Q2 of the first section 13 of the power supply. The output of inverter 24 is connected by way of capacitance C2, diode CR2, and resistance R8 to the base of transistor Q4 of the second section 14 of the power supply.

When all the inputs to the NOR gate 21 are low, the output of inverter 22 is low causing transistors Q1 and Q2 to become conductive. Transistor Q3 also becomes conductive and operating potential is supplied to the drive circuits 10-1 - 10-10 and 11. Voltage is also applied to resistance RA1 - RA11 and a high level signal is applied to the input of threshold setting drive circuit 11. When all of the inputs to the NOR gates 23 are low, the output of inverter 24 is low causing transistors Q1 and Q4 to become conductive. Therefore operating potential is supplied to the drive circuits 10-11 – 10-20 and 12, a voltage is supplied to the resistance RB1 – RB11, and a high level signal is applied to the input of the threshold setting drive circuit 12.

The detection circuitry of the apparatus for determining whether one and only one P+DRIVE signal is being produced includes a network of equal resistances RA13 – RA22 and RB13 – RB22. Each resistance has one end connected to a different one of the output terminals of the drive circuits 10-1 – 10-10 and 10-11 – 10-20. The other end of each resistance is connected to a common juncture 30. A diode CR4 is connected between the common juncture and ground, and a resistance R10 is connected between the common juncture and a -15 volt source. The voltage at the common juncture 30 is determined by the number of lines having P+DRIVE signals thereon. The resistance network RA13 – RA22 and RB13 – RB22 together with resistance R10 and the −15 volt source provide a summing of voltages at the common juncture 30. The resultant voltage varies in increments depending upon the number of resistances having a voltage drop due to current passing through them from the associated lines having P+DRIVE signals present.

The detection circuitry also includes first and second comparator circuits 31 and 32 which are connected to the common juncture 30. Operating potential for the comparator circuits is provided by the arrangement of resistance R16 and diodes CR3 and CR5 connected to the collectors of transistors Q2 and Q4 of the first and second sections 13 and 14, respectively, of the power supply. Thus, if either transistor Q2 or transistor Q4 conducts, energizing potential is applied to both the comparator circuits.

The first comparator circuit 31 has a positive input connected directly to the common juncture 30 of the resistance network. Its negative input is connected to a threshold setting arrangement including resistances R13 and R14 connected between the output connections of the threshold setting drive circuits 11 and 12 and ground. The negative input of the first comparator circuit 65 is connected to the juncture of resistances R13 and R14. The threshold setting arrangement for the first comparator circuit also employs a current source including the −15 volt source connected through resistance R12 to the negative input.

The reference voltage applied by the threshold setting arrangement to the negative input of the first comparator circuit 31 is such that in the absence of a P+DRIVE signal on all the lines the voltage at the common juncture 30 causes the output of the comparator circuit 31 to be low. If a P+DRIVE signal is present on any one or more than one of the lines, the voltage produced at the common juncture 30 is sufficiently high so that the output of the comparator circuit 31 is at a relatively high level.

The second comparator circuit 32 also has its positive input connected directly to the common juncture 30. Its negative input is connected to a threshold arrangement of resistances R11 and R15 connected in series between the output connections of the threshold setting drive circuits 11 and 12 and ground. The negative input of the second comparator circuit 32 is connected directly to the juncture of resistances R11 and R15. The second comparator circuit 32 produces a low output level when the voltage at the common juncture 30 is that produced by no P+DRIVE signals or by a P+DRIVE signal on only line. If two or more of the lines P+DRIVE signals present, the resulting voltage at the common juncture 30 causes the output of the second comparator circuit 32 to be high. The manner in which the threshold setting arrangements to the comparator circuits function to provide compensated reference voltages will be described hereinbelow.

The output of the first comparator circuit 31 is applied to one of the inputs of an exclusive-OR gate 35. The other input to the exclusive-OR gate 35 is from a portion of the control arrangement 20. The control arrangement 20 includes a NOR gaate 36 which is connected to the P+ENABLE A inputs and also a NOR gate 37 having inputs connected to the $\overline{\text{P+ENABLE B}}$ inputs. The outputs of NOR gates 36 and 37 are connected to an exclusive-OR gate 38, the output of which is the other input to the exclusive-OR gate 35. Thus, a positive-going signal is produced at the output of the exclusive-OR gate 38 if either the two $\overline{\text{P+ENABLE A}}$ signals or the two $\overline{\text{P+ENABLE B}}$ signals are present, but not if both $\overline{\text{P+ENABLE B}}$ signals are present.

The outputs from the second comparator circuit 32 and from the exclusive-OR gate 35 are applied to a NOR gate 40. The NOR gate 40 produces a high level output signal while both the output from the second comparator circuit 32 and from the exclusive-OR gate 35 remain low. If either of these outputs is high, a low lever $\overline{\text{P+ERROR}}$ signal is produced by the NOR gate 40. A low level $\overline{\text{P+ERROR}}$ signal from the NOR gate 68 indicates an error, either none of the drive lines has a P+DRIVE signal thereon or two or more of the drive lines have P+DRIVE signals thereon.

The apparatus as shown and described operates in response to appropriate enabling, clock, and data signals to produce drive signals and, if other than one drive signal is present, an error signal. If both negative-going $\overline{\text{P+ENABLE A}}$ signals and a negative-going $\overline{\text{P+CLOCK A}}$ signal are present, the output of inverter 22 is low causing transistor Q1 to conduct. The combination of the conduction in transistor Q1 and the low output of inverter 22 causes transistor Q2 and consequently transistor Q3 of the first section 13 of the power supply to become conductive. Operating potentials are thus applied to the drive circuits 10-1 – 10-10 and 11, to the resistances RA1 – RA11 connected to the outputs of the drive circuits, and to the comparators 31 and 32. In addition, the two $\overline{\text{P+ENABLE A}}$ signals cause the output of the exclusive-OR gate 38 to be high unless both $\overline{\text{P+ENABLE B}}$ signals are also present. The apparatus is thus activated to receive data on lines $\overline{\text{P+DATA 1}}$ – $\overline{\text{P+DATA 10}}$. A negative-going $\overline{\text{P+DATA}}$ signal causes the associated drive circuit 10-1 – 10-10 to produce a positive-going signal on the associated P+DRIVE line.

In a similar manner if both $\overline{\text{P+ENABLE B}}$ signals and a $\overline{\text{P+CLOCK B}}$ signal are present, the output of inverter 24 is low causing transistor Q1 to conduct. The conduction through transistor Q1 together with the low output of inverter 24 causes transistor Q4 and consequently transistor Q5 of the second section 14 of the power supply to become conductive. Operating potentials are thus supplied to drive circuits 10-11 – 10-20 and 12, to the resistances RB1 – RB11 connected to the outputs of the drive circuits, and to the comparators 31 and 32. In addition the two $\overline{\text{P+ENABLE B}}$ signals cause the output of the exclusive-OR gate 38 to be high, unless both P+ENABLE A signals are also present. The apparatus is thus activated to receive data on lines P+DATA 11 - P+DATA 20. A negative-going P+DATA signal causes the associated drive circuit 10-11 - 10-20 to produce a positive-going signal on the associated P+DRIVE line.

If when the apparatus is activated none of the lines P+DRIVE 1 - P+DRIVE 20 has a relatively high level drive signal present, the voltage produced at the common juncture 30 is less than the reference voltages at the negative inputs of the comparator circuits 31 and 32. The outputs of both comparator circuits 31 and 32 remain low. The low output from the first comparator circuit 31 together with the high output from the exclusive-OR gate 38 causes the output of exclusive-OR gate 35 to be high. the high output of the exclusive-OR gate 35 and the low output of the second comparator circuit 32 causes the P+ERROR signal from the NOR gate 40 to be low indicating an error.

If one of the lines P+DRIVE 1 - DRIVE 20 has a drive signal present, the voltage produced at the common juncture 30 is higher than the reference voltage at the negative input of the first comparator circuit 31 and lower than the reference voltage at the negative input of the second comparator circuit 32. The output of the first comparator circuit 31 is high and that of the second comparator circuit 32 is low. Thus, the output of the exclusive-OR gate 35 is low and the output of the NOR gate 40 is high indicating no error.

If two or more of the lines P+DRIVE 1 - P+DRIVE 20 have drive signals present, the voltage produced at the common juncture 30 is higher than the reference voltages at the negative inputs of both comparator circuits 31 and 32. The outputs of both comparator circuits 31 and 32 are high. Thus the output of the exclusive-OR gate 35 is low and the output signal P+ERROR of the NOR gate 40 is low indicating an error.

As explained previously, the threshold setting arrangements providing reference voltages to the negative inputs of - comparator circuits 31 and 32 includes threshold setting drive circuits 11 and 12. When a section of the power supply, for example the first section 13, is activated, the output of the associated threshold setting drive circuit 11 is low and is equal to the outputs of any of the other drive circuts 10-1 10-10 which do not have a low level P+DATA input signal applied thereto. The output of any of drive circuits 10-1 - 10-10 which have a low level P+DATA input sgnal applied thereto is high. Drive circuits 10-1 - 10-10 and 11 are electrically identical and are in close physical relationship. Therefore, low level output signals from different drive circuits vary very little from deach other, and similarly high level output signals from different drive circuits vary very little from each other.

It can be seen that changes in the output voltage levels from the drive circuits 10-1 - 10-10 change the voltage produced at the common juncture or summing point 30. If the reference voltages at the negative inputs of the comparator circuits 31 and 32 were fixed, differences in the voltage produced at the common juncture 30 caused by variations in the output voltage levels of the drive circuits could cause one or both of the comparator circuits 31 and 32 to make an incorrect determination as to the number of drive circuits producing a high level output signal. With the apparatus as described, however, the voltage at the outputs of the threshold setting drive circuits 11 and 12 varies with variations in the output voltages from the other drive circuits. A portion of the output voltage from whichever one of the threshold setting drive circuits 11 and 12 is operating is applied by way of the voltage divider of resistances R11 and R15 to the negative input of the second comparator circuit 32. The voltage from the operating threshold setting drive circuit is also applied across the voltage divider of resistances R13 and R14. The voltage at the juncture of resistances R13 and R14 is reduced by current flow from the −15 volt source through resistances R12 and R14. The resultant voltage is applied at the negative input of the first comparator circuit 31. Thus, the voltage setting arrangements provide variable reference voltages which compensate for variations in the voltage at the common juncture 30 caused by variations in the drive circuit output voltages. The apparatus as shown in FIG. 1 was fabricated employing the components listed below

| | |
|---|---|
| Inverting Buffers 10-10 - 10-20, 11, and 12 | SN5406 |
| Comparators 31 and 32 | MC1514 |
| NOR Gates 21, 23, 36, 37, and 40 | SN54LS27 |
| Exclusive-OR Gates 35 and 38 | SN54LS86 |
| Inverters 22 and 24 | SN5406 |
| Transistors Q1, Q2, Q4 | 2N2907A |
| Transistors Q3 and Q5 | 2N2222A |
| Zener Diodes CR1-CR5 | 1N4148 |
| C1 and C2 | 3.3 μf |
| RA1-RA12 and RB1-RB12 | 1.2 KΩ |
| RA13-RA22 and RB13-RB22 | 43 KΩ |
| R1 | 825Ω |
| R2 | 825Ω |
| R3 | 1 KΩ |
| R4 | 1 KΩ |
| R5 | 825Ω |
| R6 | 1 KΩ |
| R7 | 1 KΩ |
| R8 | 825Ω |
| R9 | 1 KΩ |
| R10 | 34 KΩ |
| R11 | 2.49 KΩ |
| R12 | 52.3 KΩ |
| R13 | 2.49 KΩ |
| R14 | 7.50 KΩ |
| R15 | 7.50 KΩ |
| R16 | 100Ω |

The specific apparatus as described produced a voltage a the common juncture 30, the positive inputs to both comparator circuits 31 and 32, which differed in increments of 700 millivolts for each drive circuit producing a high level output signal. The threshold setting arrangements were designed to produce reference voltages at the negative inputs of the comparators which provided a margin of 300 millivolts below the voltage level at the common juncture 30 which would cause triggering of their respective comparators. This margin was nearly optimum for the incremental changes of 700 millivolts in the voltage produced at the common juncture 30. However, the low level output of the drive circuits fluctuated between a value of 100 and 400 millivolts producing a voltage at the common juncture 30 which varied over a range of approximately 225 millivolts. If the reference voltages at the negative inputs of the comparator circuits had been fixed, the margin would have been reduced under certain conditions so that operation of the apparatus would have been unreliable. With apparatus employing the compensating threshold setting arrangements as described, the margin of about 300 millivolts remained fairly constant over the ranges of low level output voltages produced by the drive circuits.

While there has been shown and described what is considered a preferred embodiment of the present invention, it will be obvious to those skilled in the art that various changes and modifications may be made therein without departing from the invention as defined in the appended clams.

WHAT IS CLAIMED IS:

1. Apparatus for transmitting signals along a plurality of paths and for determining whether or not signals are being transmitted on a predetermined number of the paths, said apparatus including in combination a plurality of signal paths, each signal path including
an input terminal adapted to receive input signal data,
an output terminal, and
a driving means having an input connection coupled to said input terminal and an output connection coupled to said output terminal;

additional driving means having an input connection and an output connection;

activating means coupled to the driving means of the plurality and to the additional driving means for applying operating potentials to the driving means;

each of said driving means being operable to produce a first output voltage at its output connection in response to a first input condition at its input connection, and being operable to produce a second output voltage at its output connection in response to a second input condition at its input connection when operating potentials are applied thereto by the activating means;

a resistance network comprising an equal plurality of resistances, each resistance having one end connected to the output connection of a different one of the driving means of said plurality and the other end connected to a common juncture, the voltage level produced at the common juncture being proportional to the number of output connections having said first output voltage present thereon;

first comparator means having a first and a second input, the first input being connected to said common juncture;

first threshold setting means connected to the output connection of said additional driving means and to the second input of the first comparator means, said first threshold setting means being operable to produce a voltage at the second input to the first comparator means which is less than the voltage produced at the first input to the first comparator means when a predetermined number (N) of output connections of the driving means of said plurality have said first output voltage present thereon and greater than the voltage produced at the first input to the first comparator means when said predetermined number minus one (N−1) of output connections of the driving means of said plurality have said first output voltage present thereon;

said first comparator means being operable to produce a first output signal when the voltage at its first input is less than that at its second input and to produce a second output signal when the voltage at its first input is more than that at its second input;

second comparator means having a first and a second input, the first input being connected to said common juncture;

second threshold setting means connected to the output connection of said additional driving means and to the second input of thesecond comparator means, said second threshold setting means being operable to produce a voltage at the second input to the second comparator means which is less than the voltage produced at the first input of the second comparator means when said predetermined number plus one (N+1) output connections of the driving means of said plurality have said first output voltage present thereon and greater than the voltage produced at the first input to the second comparator means when said predetermined number (N) of output connections of the driving means of said plurality have said first output voltage present thereon;

said second comparator means being operable to produce a first output signal when the voltage at its first input is less than that at its second input and to produce a second output signal when the voltage at its first input is more than that at its second input; and output means coupled to said first and second comparator means for producing an error signal in response to a first output signal from the first comparator means or a second output signal from the second comparator means.

2. Apparatus in accordance with claim 1 including
enabling means for producing an enabling signal in response to predetermined input conditions being applied thereto; and
said output means being coupled to said enabling means and being operable to produce said error signal in response to a first output signal from the first comparator means or a second output signal from the second comparator means during an enabling signal.

3. Apparatus in accordance with claim 2 wherein
said activating means is coupled to said enabling means and is operable to apply operating potentials to the driving means and said second input condition to the input connection of said additional driving means during an enabling signal.

4. Apparatus in accordance with claim 3 wherein said output means includes
first logic means connected to the first comparator means and to said enabling means, said first logic means being operable to produce a first output signal during an enabling signal in response to a second output signal from the first comparator means and to produce a second output signal during an enabling signal in response to a first output signal from the first comparator means; and
second logic means connected to the first logic means and to the second comparator means, said second logic means being operable to produce said error signal during a second output signal from the first logic means or during a second output signal from the second comparator means.

5. Apparatus in accordance with claim 1 wherein
said activating means includes means connected to the input connection of said additional driving means for applying said second input condition to the input connection whereby the additional driving means produces said second output voltage at its output connection.

6. Apparatus in accordance with claim 5 wherein
said first threshold setting means includes first and second resistance means connected in series between the output connection of said additional driving means and a point of reference potential;

said second input of the first comparator means is connected to the juncture of the first and second resistance means;

said second threshold setting means includes third and fourth resistance means connected in series between the output connection of said additional driving means and said point of reference potential; and said second input of the second comparator means is connected to the juncture of the third and fourth resistance means.

7. Apparatus in accordance with claim 6 wherein one of said threshold setting means includes a current source connected to the second input of the associated comparator means.

8. Apparatus in accordance with claim 7 including enabling means for producing an enabling signal in response to predetermined in put conditions being applied thereto; and said output means being coupled to said enabling means and being operable to produce said error signal in response to a first output signal from the first comparator means or a second output signal from the second comparator means during an enabling signal.

9. Apparatus in accordance with claim 8 wherein said activating means is coupled to said enabling means and is operable to apply operating potentials to the driving means and said second input condition to the input connection of said additional driving means during an enabling signal.

10. Apparatus in accordance with claim 9 wherein said output means includes first logic means connected to the first comparator means and to said enabling means, said first logic means being operable to produce a first output signal during an enabling signal in response to a first output signal from the first comparator means; and second logic means connected to the first logic means and to the second comparator means, said second logic means being operable to produce said error signal during a second output signal from the first logic means or during a second output signal from the second comparator means.

* * * * *